United States Patent Office 3,121,108
Patented Feb. 11, 1964

3,121,108
1-AMINO-1-PERFLUOROALKYL-ETHYLENE COMPOUNDS
Alden D. Josey and Stephen Proskow, Wilmington, Del., assignors to E. I. du Pont de Nemours and Company, Wilmington, Del., a corporation of Delaware
No Drawing. Filed Oct. 30, 1959, Ser. No. 849,736
7 Claims. (Cl. 260—465.4)

This invention relates to a new class of ethylenic compounds. More particularly, it relates to a new class of such compounds having amino and fluoroalkyl substituents.

Ethylenic compounds have been a prolific source of commercially useful products. For example, a number of such compounds, e.g., vinyl chloride and tetrafluoroethylene, are used in making plastics.

A novel class of ethylenic compounds that are especially useful as herbicides and as intermediates in the synthesis of dyes is provided by this invention. These new compounds are ethylenic compounds wherein one and the same ethylenic carbon bears an amino group and an $R_f$ group, where $R_f$ is perfluoroalkyl, omega-hydroperfluoroalkyl, or omega-chloroperfluoroalkyl.

The products of this invention have the general formula $$X-C=C-NH_2$$
$$\phantom{X-}|\phantom{=}|$$
$$\phantom{X-C=}Y\phantom{=}R_f$$

wherein $R_f$ is perfluoroalkyl, omega-hydroperfluoroalkyl, or omega-chloroperfluoroalkyl of 1 to 12 carbon atoms. X and Y, which can be the same or different, are —CN, —COOC$_2$H$_5$

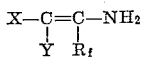

alkyl, and X and Y together can be

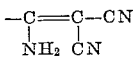

where $n$ is a positive integer from 3–7, inclusive.

The products of this invention are prepared by the reaction of a fluoroalkyl nitrile of the formula $R_fCN$ (where $R_f$ has the meaning defined above), with an alkali metal derivative of a reactive methylene compound. By "reactive methylene compound" is meant a compound having a methylene, =CH$_2$, group joined to at least one atom which is in turn bonded to another atom by a multiple bond. The preferred compounds of the formula given above are made by reacting a fluoroalkylnitrile, $R_fCN$, with a compound of the formula

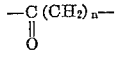

wherein $R_f$, X and Y have the meanings defined above and M is an alkali metal, i.e., lithium, sodium, potassium, rubidium or cesium.

The process of this invention is conveniently carried out by first preparing a solution of the alkali metal derivative of the active methylene compound and then adding to this solution the fluoroalkylnitrile. A solution of the reactive methylene compound in an inert solvent, e.g., ethylene glycol dimethyl ether, is added slowly to a stirred suspension of a mineral oil dispersion of an alkali metal hydride, e.g., sodium hydride, in the inert solvent maintained at a temperature below about 25° C. When the salt formation is complete, the fluoroalkylnitrile reactant is added slowly to the salt solution, the temperature of the reaction mixture being maintained during the reaction below the boiling point of the fluoroalkylnitrile. Alternatively, the reaction can be carried out at somewhat higher temperatures provided the reaction vessel is fitted with a condenser cooled to a temperature below the boiling point of the reactants in order to prevent loss of volatile reactants. Reaction between the fluoroalkylnitrile and the alkali metal derivative of the methylene compound takes place rapidly and is essentially complete by the time all the fluoroalkylnitrile has been added. However, the reaction mixture is generally stirred for periods ranging from 15 minutes to 1 hour or more to insure completeness of reaction.

Instead of preparing the solution of the alkali metal salt of the reactive methylene compound as described above, a solution containing the reactive methylene compound and a catalytic amount of the alkali metal hydride, e.g., 0.01–5% of the stoichiometric amount, can be used for reaction with the fluoroalkylnitrile. In this embodiment the alkali metal salt of the reactive methylene compound is formed in situ. In this method, longer reaction times, e.g., up to 6 hours or more, are required to obtain good yields of the ethylenic compounds having amino and fluoroalkyl substituents.

Equimolar amounts of the reactive methylene compound and the fluoroalkylnitrile are required in this reaction. However, it is generally preferred to use a slight eccess, e.g., a 5–10% excess, of the fluoroalkylnitrile to compensate for any loss of the volatile reactant from the reaction vessel.

The reaction temperature and pressure are not critical. Temperatures ranging from 100° C. down to a temperature that is low as possible to obtain without the precipitated salt formed during the reaction impeding the mixing of the reaction mixture. Temperatures of 25° C. down to —50° C. are commonly employed. The reaction takes place satisfactorily at atmospheric pressure. However, subatmospheric or superatmospheric pressures can be employed if desired.

Any inert reaction medium can be employed in the process of this invention. Reaction media that are capable of dissolving the alkali metal salts of reactive methylene compounds at room temperature or slightly lower are preferred. Ethers are particularly well suited as reaction media and specific examples of suitable ethers include ethylene glycol dimethyl ether, tetrahydrofuran, dioxane, dibutyl ether, and the like. Hydrocarbons, e.g., benzene, can be used as reaction media but are not preferred since they do not dissolve the alkali metal salts of the reactive methylene compounds.

Care must be taken that the reaction vessel and reaction media are thoroughly dry. It is also preferable that the reaction be carried out in an inert atmosphere, e.g., dry air, dry nitrogen, and the like, in order to prevent entry of atmospheric moisture into the reaction zone.

The invention is illustrated in further detail by the following examples.

EXAMPLE I

*Addition of Malononitrile to Trifluoroacetonitrile*

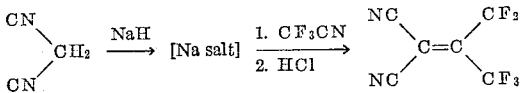

To a stirred suspension of 4.70 g. (0.1 mole) of a 51.2% mineral oil dispersion of sodium hydride in 150 ml. of ethylene glycol dimethyl ether, there was added dropwise a solution of 6.6 g. (0.1 mole) of malononitrile in 25 ml. of ethylene glycol dimethyl ether. The temperature of the mixture was maintained below 25° C. throughout this addition. When the salt formation was complete, the solution was cooled to —10° C., and 8.5 ml. (ca. 0.1 mole) of trifluoroacetonitrile was slowly introduced by distillation below the surface of the solution.

When this addition was complete, stirring was continued 1 hour, and the mixture was cooled in an ice bath and acidified with concentrated hydrochloric acid. After short stirring, the mixture was filtered, and the filtrate was evaporated to provide 15.8 g. (98%) of light yellow crystalline solid. Crystallization from chloroform-acetone gave colorless, stubby prisms of 1-amino-1-trifluoromethyl-2,2-dicyanoethylene, M.P. 179–180° C.

*Analysis.*—Calc'd for $C_5H_2F_3N_3$: C, 37.28; H, 1.25; F, 35.38; N, 26.09. Found: C, 37.49; H, 1.36; F, 35.60; N, 26.59.

EXAMPLE II

*Addition of Diethyl Malonate to Trifluoroacetonitrile*

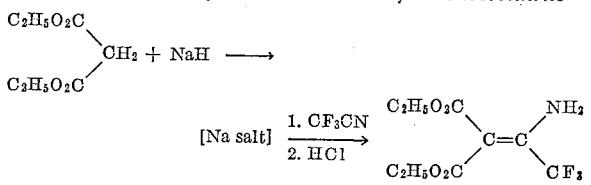

A solution of 16.0 g. (0.1 mole) of diethyl malonate in 25 ml. of ethylene glycol dimethyl ether was added dropwise to a slurry of 4.56 g. (0.1 mole) of a 52.7% mineral oil dispersion of sodium hydride in 225 ml. of ethylene glycol dimethyl ether. When the evolution of hydrogen had ceased, the clear solution was chilled with a solid carbon dioxide-acetone bath to ca. −50° C., and introduction of 8.5 ml. (ca. 0.1 mole) of trifluoroacetonitrile by distillation was begun. When this addition was complete, the solution was stirred for 1 hour, and concentrated hydrochloric acid (ca. 10 ml.) was added to the point of acidity. Precipitated sodium chloride was removed by filtration, and the filtrate was evaporated in vacuo to provide a clear oil. On standing, the oil crystallized. The oil was taken up in 200 ml. of pentane, and this solution, on concentration and cooling afforded long, colorless crystals of 1-amino-1-trifluoromethyl-2,2-dicarbethoxyethylene, M.P. 125–127° C.

EXAMPLE III

*Addition of Ethyl Cyanoacetate to Trifluoroacetonitrile*

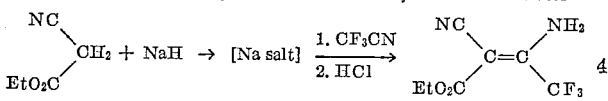

To a stirred suspension of 4.56 g. (0.1 mole) of a 52.7% mineral oil dispersion of sodium hydride in 225 ml. of ethylene glycol dimethyl ether, there was added slowly a solution of 11.3 g. (0.1 mole) of ethyl cyanoacetate in 25 ml. of ethylene glycol dimethyl ether. The temperature of the mixture was not allowed to exceed 30° C. during the addition. When no further evolution of hydrogen occurred, the white slurry of sodio derivative was cooled in an ice water bath while 8.5 ml. (ca. 0.1 mole) of trifluoroacetonitrile was introduced slowly by distillation. A solid carbon dioxide-acetone condenser prevented loss of the nitrile. Stirring was continued 1 hour after the addition was complete, then the mixture was carefully acidified with concentrated hydrochloric acid, filtered, and the filtrate was evaporated to dryness. There was obtained 20.27 g. (97.5%) of light yellow solid. Purification was effected by crystallization from chloroform-pentane to provide white needles of 1-amino-1-trifluoromethyl-2-carbethoxy-2-cyanoethylene, M.P. 118–120° C.

EXAMPLE IV

*Addition of Malononitrile Dimer to Trifluoroacetonitrile*

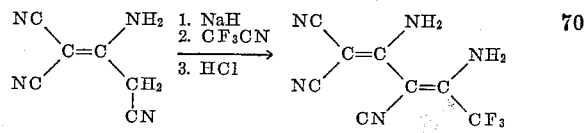

A solution of 13.2 g. (0.1 mole) of malonitrile dimer in 75 ml. of ethylene glycol dimethyl ether was added to a slurry of 4.70 g. (0.1 mole) of 51.2% mineral oil suspension of sodium hydride in 150 ml. of ethylene glycol dimethyl ether. When salt formation was complete, the clear solution was cooled to 5–10° C. whereupon some of the salt precipitated. Into this suspension there was introduced 8.5 ml. of acetonitrile by distillation, and a pink color was observed to form. When the addition was complete, there resulted a clear, red solution which was refrigerated overnight. The cold solution was carefully acidified with concentrated hydrochloric acid, filtered, and the filtrate was evaporated to yield a light yellow crystalline solid contaminated with a small amount of sodium chloride. Extraction with hot acetone and evaporation provided an essentially quantitative yield of 1,3-diamino-1-trifluoromethyl-2,4,4-tricyano-1,3-butadiene, M.P. ca. 250° C. with sublimation.

EXAMPLE V

*Addition of Cyclohexanone to Trifluoroacetonitrile*

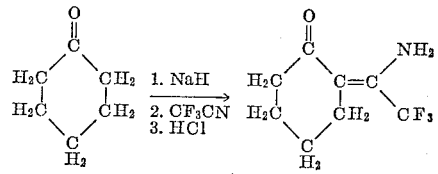

A solution of 9.8 g. (0.1 mole) of cyclohexanone in 25 ml. of ethylene glycol dimethyl ether was added slowly to a slurry of 4.70 g. (0.1 mole) of a 51.2% mineral oil dispersion of sodium hydride in 225 ml. of ethylene glycol dimethyl ether at room temperature (20–30° C.). Salt formation proceeded very sluggishly with slow evolution of hydrogen. Trifluoroacetonitrile (8.5 ml., ca. 0.1 mole) was distilled into the suspension at a slow rate. On completion of this addition, the mixture was acidified with concentrated hydrochloric acid, filtered, and the filtrate was evaporated to yield a brown oil. There could be isolated 1.2 g. (6.2%) of crystalline α-(aminotrifluoromethylmethylene)cyclohexanone, M.P. 158–160° C.

EXAMPLE VI

*Addition of Malononitrile to Heptafluorobutyronitrile*

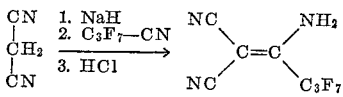

A solution of sodiomalononitrile was prepared by reaction of 1.32 (0.02 mole) of malononitrile with 0.94 g. (0.02 mole) of 51.2% mineral oil dispersion of sodium hydride in 40 ml. of ethylene glycol dimethyl ether. The solution was cooled to 0° C., and addition of gaseous heptafluorobutyronitrile was commenced. After a short period, the temperature of the reaction mixture was lowered to −30° C., and introduction of the fluoronitrile was continued until an excess, i.e., more than 0.02 mole, had been added. The solution was then chilled in an ice bath, and concentrated hydrochloric acid was added until the mixture was acidic. Filtration and evaporation of the filtrate provided 2.32 g. (89%) of light tan crystalline 1-amino-1-heptafluoropropyl-2,2-dicyanoethylene. Crystallization from chloroform-acetone provided white needles, M.P. 174–176° C.

The examples have illustrated the products of this invention by reference to the preparation of certain 1-amino-1-perfluoroalkyl ethylenic compounds. However, the products of this invention include other ethylenic compounds where one and the same ethylenic carbon bears an amino group and a $R_f$ group, where the $R_f$ is perfluoroalkyl, omega-hydroperfluoroalkyl or omega-chloroperfluoroalkyl. Thus, the invention also includes the products listed in the third column of the following Table I and these are prepared from the reactants listed in the first two columns.

TABLE I

| Reactants | | Products |
|---|---|---|
| $X-\overset{\ominus}{C}H\ \overset{\oplus}{M}$ <br> $\|$ <br> $Y$ | $R_fCN$ | |
| $NC-\overset{\ominus}{C}H\ \overset{\oplus}{Li}$ <br> $\|$ <br> $CN$ | $ClCF_2CN$ | $NC-C=C-NH_2$ <br> $\|\quad\|$ <br> $CN\ \ CF_2Cl$ |
| $O=C-\overset{\ominus}{C}H\ \overset{\oplus}{K}$ <br> $\|\quad\quad$ <br> $H_2C-CH_2$ | $HCF_2CN$ | $O=C-C=C-NH_2$ <br> $\|\quad\quad\|\quad\|$ <br> $H_2C-CH_2\ \ CF_2H$ |
| $NC-\overset{\ominus}{C}H\ \overset{\oplus}{Li}$ <br> $\|$ <br> $CN$ | $CF_2=CF-CF_2CN$ | $NC-C=C-NH_2$ <br> $\|\quad\|$ <br> $CN\ \ CF_2-CF=CF_2$ |
| $NC-\overset{\ominus}{C}H\ \overset{\oplus}{Rb}$ <br> $\|$ <br> $CN$ | $H(CF_2)_4CN$ | $NC-C=C-NH_2$ <br> $\|\quad\|$ <br> $CN\ (CF_2)_4H$ |
| $NC-\overset{\ominus}{C}H\ \overset{\oplus}{Cs}$ <br> $\|$ <br> $CN$ | $Cl(CF_2)_4CN$ | $NC-C=C-NH_2$ <br> $\|\quad\|$ <br> $CN\ (CF_2)_4Cl$ |
| $NC-\overset{\ominus}{C}H\ \overset{\oplus}{Li}$ <br> $\|$ <br> $CN$ | $Cl(CF_2)_8CN$ | $NC-C=C-NH_2$ <br> $\|\quad\|$ <br> $CN\ (CF_2)_8Cl$ |
| $NC-\overset{\ominus}{C}H\ \overset{\oplus}{K}$ <br> $\|$ <br> $CN$ | $H(CF_2)_{12}CN$ | $NC-C=C-NH_2$ <br> $\|\quad\|$ <br> $CN\ (CF_2)_{12}H$ |
| $NC-\overset{\ominus}{C}H\ \overset{\oplus}{Li}$ <br> $\|$ <br> $CN$ | $Cl(CF_2)_{10}CN$ | $NC-C=C-NH_2$ <br> $\|\quad\|$ <br> $CN\ (CF_2)_{10}Cl$ |

The products of this invention are useful in a variety of applications. They are particularly useful as chemical intermediates. For example, they are intermediates in the preparation of fluorocarbon-substituted 5(3)pyrazoles.

These 1-amino-1-fluoroalkyl ethylenic compounds are also useful as intermediates for the preparation of azo dyes. In this use, the 1-amino-1-fluoroalkyl ethylenic compound is first diazotized and then coupled with a phenol to form the azo dye.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Products represented by the formula $$X-C=C-NH_2$$
$$\ \ \ |\quad\ |$$
$$\ \ \ Y\quad R_f$$

wherein $R_f$ is of 1–12 carbons and a member of the class consisting of perfluoroalkyl, omega-hydroperfluoroalkyl and omega-chloroperfluoroalkyl, X and Y each are members of the class consisting of —CN, —COOC$_2$H$_5$ and —C(NH$_2$)=C(CN)$_2$, and can be joined to form $$-\underset{\underset{O}{\|}}{C}(CH_2)_n-$$

wherein $n$ is a positive integer of from 3 to 7, inclusive.

2. 1 - amino - 1 - trifluoromethyl - 2,2 - dicyanoethylene.

3. 1 - amino - 1 - trifluoromethyl - 2,2 - dicarbethoxyethylene.

4. 1 - amino - 1 - trifluoromethyl - 2 - carbethoxy - 2 - cyanoethylene.

5. 1,3 - diamino - 1 - trifluoromethyl - 2,4,4 - tricyano-1,3-butadiene.

6. α - (Aminotrifluoromethylmethylene)cyclohexanone.

7. 1 - amino - 1 - heptafluoropropyl - 2,2 - dicyanoethylene.

References Cited in the file of this patent
UNITED STATES PATENTS

| 2,719,861 | Carboni | Oct. 4, 1955 |
| 2,852,552 | Little, et al. | Sept. 16, 1958 |

FOREIGN PATENTS

| 922,531 | Germany | Jan. 17, 1955 |

OTHER REFERENCES

Bergmann: "Acetylene Chemistry," 1948, page 80.